US006935436B1

(12) United States Patent
Williston

(10) Patent No.: US 6,935,436 B1
(45) Date of Patent: Aug. 30, 2005

(54) DOUBLE-HEADED TENT STAKE DRIVER AND PULLER HAVING TWIN RELEASE LEVERS

(75) Inventor: Christopher A. Williston, Bitburg (DE)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 46 days.

(21) Appl. No.: 10/632,074

(22) Filed: Aug. 1, 2003

(51) Int. Cl.[7] .................................................. B25D 1/16
(52) U.S. Cl. ........................... 173/90; 173/91; 173/132; 173/171
(58) Field of Search ........................... 173/90, 91, 132, 173/171; 279/97, 18, 19.5, 19.6; 403/321, 403/322.1, 322.4, 325, 326, 327, 330; 29/239, 29/255, 278, 282

(56) References Cited

U.S. PATENT DOCUMENTS

| 846,389 | A | * | 3/1907 | Blackburn | 403/108 |
|---|---|---|---|---|---|
| 1,443,835 | A | * | 1/1923 | Buikema | 403/108 |
| 1,969,798 | A | * | 8/1934 | Hultquist | 279/19.5 |
| 2,525,316 | A | * | 10/1950 | Schiff | 173/91 |
| 2,682,414 | A | * | 6/1954 | Richardson | 279/77 |
| 3,004,523 | A | * | 10/1961 | Christensen | 173/133 |
| 3,519,087 | A | * | 7/1970 | Santi | 173/91 |
| 3,739,452 | A | | 6/1973 | Gadberry | |
| 3,910,590 | A | * | 10/1975 | Ekstrom | 279/19.1 |
| 4,483,058 | A | * | 11/1984 | Clutter et al. | 29/254 |
| 4,485,956 | A | | 12/1984 | Van Iperen | |
| 4,570,980 | A | * | 2/1986 | Goward | 285/305 |
| 4,720,904 | A | | 1/1988 | Palla, Jr. | |
| 5,050,286 | A | * | 9/1991 | Miyanaga | 29/275 |
| 5,113,687 | A | | 5/1992 | Palmgren | |
| 5,564,304 | A | * | 10/1996 | Schlabach | 72/479 |
| 5,694,672 | A | | 12/1997 | Perin | |
| 5,984,272 | A | | 11/1999 | Crider | |

OTHER PUBLICATIONS

Christopher A. Williston, Copending, Commonly Assigned Patent Application: "Double-Headed Tent Stake Driver and Puller", AFD 626, Filed on Even Date.

* cited by examiner

*Primary Examiner*—Stephen F. Gerrity
*Assistant Examiner*—Nathaniel Chukwurah
(74) *Attorney, Agent, or Firm*—AFMCLO/JAZ; Richard A. Lambert

(57) ABSTRACT

A double-headed tent stake driver and puller having twin release levers for inserting and removing tent stakes, nails and the like is described. The tent stake driver and puller includes a slide hammer and a coupler mounted on the distal end of the slide hammer shaft. The coupler has an elongate body with an open end and a hollow core sized to receive the head of the stake or nail intended for use with the present invention. The coupler includes a pair of retractable keepers slidably received within a corresponding pair of slots. The keepers provide the twofold benefits of retaining the stake once inserted into the coupler, and presenting a surface for imparting the extraction force upon a stake to be pulled from the ground. A pair of spring loaded release levers are provided to enable one-handed retraction of the keepers for receipt of the tent stake. When released, the spring loaded release levers return the keepers to a closed position, retaining the stake therein.

3 Claims, 4 Drawing Sheets

DOUBLE-HEADED TENT STAKE DRIVER AND PULLER HAVING TWIN RELEASE LEVERS

RIGHTS OF THE GOVERNMENT

The invention described herein may be manufactured and used by or for the Government of the United States for all governmental purposes without the payment of any royalty.

BACKGROUND OF THE INVENTION

The present invention relates generally to extraction devices and more particularly to a double-headed tent stake driver and puller for use with a slide hammer.

This application is related to my copending and commonly assigned patent application "DOUBLE-HEADED TENT STAKE DRIVER AND PULLER" filed on even date herewith.

The utility of tents for providing temporary as well as permanent shelter is well known. Tents are available in a wide variety of sizes and configurations and are extensively used by the armed forces, for example, in areas where the construction of permanent shelter is not deemed practicable or desirable. While tent design varies, most tents utilize stakes driven into the ground to anchor the tent in place.

The design of tent stakes varies widely as well, but many stakes are, in essence, large double-headed nails. In use, the stakes are driven into the ground, typically by the use of a sledge or pneumatic hammer, and the tent stays or cords are attached thereto to anchor the tent. When it is desired to lower the tent, the stake is pulled from the ground by a pry bar placed under the upper head of the stake.

This method of driving and pulling tent stakes, while effective, leaves much to be desired. For example, use of a sledge hammer often damages the stake or adjacent tent rails because sledge hammers are hard to control, especially when used by inexperienced personnel or in situations where the ground to be penetrated is hard, necessitating the use of great force. Personnel safety is also a concern since the swing of a sledge hammer requires a large space, and inattentive passersby can be severely injured. Moreover, the use of a pry bar for extraction of the stake is often disadvantageous because the stakes are easily bent or damaged since the extraction forces imparted upon the stake by the pry bar are curvilinear. Adjacent tent rails are easily damaged as well since the pry bar must be leveraged against a solid object and sometimes the rails are in the way of the pry bar.

A need exists therefore for an improved tool for use in driving and pulling double-headed tent stakes. Such a tool would be lightweight, compact and easy to carry and use.

SUMMARY OF THE INVENTION

Accordingly, it is a primary object of the present invention to provide a double-headed tent stake driver and puller overcoming the limitations and disadvantages of the prior art.

Another object of the present invention is to provide a double-headed tent stake driver and puller that incorporates a slide hammer for a compact, effective driving and pulling action.

Still another object of the present invention is to provide a coupler for attachment to a slide hammer that includes a pair of retractable keepers for retaining the head of a tent stake or nail to exert both driving and pulling forces thereon.

Yet another object of the present invention is to provide a double-headed tent stake driver and puller having twin release levers enabling a simple, one handed attachment and removal operation.

These and other objects of the invention will become apparent as the description of the representative embodiments proceeds.

In accordance with the foregoing principles and objects of the invention, a double-headed tent stake driver and puller is provided to install and extract double-headed tent stakes. The invention has particular utility on double-headed stakes and nails wherein the second head extends a distance from the material surface, providing a ready gripping surface.

The double-headed tent stake driver and puller of the present invention includes a slide hammer and a coupler mounted on the distal end of the slide hammer shaft. The coupler has an elongate body with closed first end attached to the shaft and a second, open end sized to receive the head of the stake or nail.

Advantageously and according to an important aspect of the present invention, the coupler includes a pair of retractable keepers slidably received within a corresponding pair of slots located adjacent the open end. The keepers provide the twofold benefits of retaining the stake once inserted into the coupler, and presenting a surface for imparting an extraction force upon a stake to be pulled from the ground.

A pair of spring loaded release levers enable one handed retraction of the keepers for receipt of the tent stake. In use, the release levers are squeezed together by the user, retracting the keepers for receipt of the tent stake or nail. When the user lets go of the release levers, the springs urge the keepers to a closed position, thereby retaining the tent stake or nail within the coupler.

As stated, the keepers exert an upward force on the underside of the stake head during use, thereby imparting the pulling force. Conversely, the closed end of the coupler provides a surface for imparting the driving force when insertion into the ground is desired. In this way, the double-headed tent stake driver and puller of the present invention can be used to both drive tent stakes into the ground as well as remove them. The slide hammer is compact, enhancing safety and simplicity, and imparts direct, linear forces to the stake, enabling the stakes to be installed in close proximity and removed without bending.

As can be seen, the double-headed tent stake driver and puller of the present invention presents a dramatic advance over the apparatuses and methods of the prior art by not only simplifying and improving operation but by a significant reduction in cost incurred from damage to the stakes from insertion and removal by the prior art methods.

BRIEF DESCRIPTION OF THE DRAWING

The accompanying drawing incorporated in and forming a part of the specification, illustrates several aspects of the present invention and together with the description serves to explain the principles of the invention. In the drawing.

DETAILED DESCRIPTION OF THE INVENTION

Figure 1:
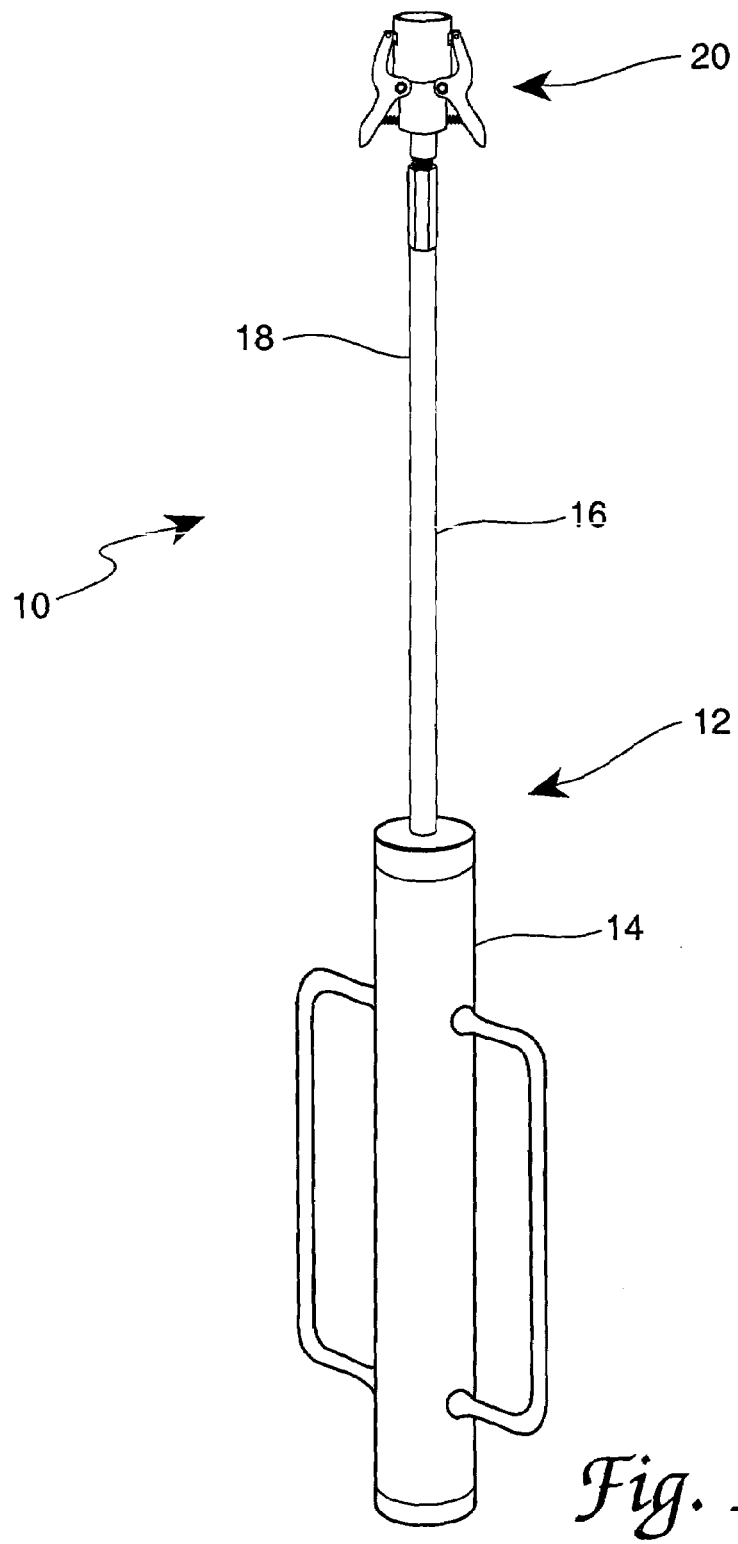
FIG. 1 is a perspective view of the double-headed tent stake driver and puller of the present invention.

Reference is now made to the drawing figures illustrating the double-headed tent stake driver and puller having twin release levers of the present invention. The double-headed tent stake driver and puller 10 can be effectively used to drive tent stakes into the ground and remove them. The double-headed tent stake driver and puller is lightweight, compact and easy to carry and use.

Figure 2:
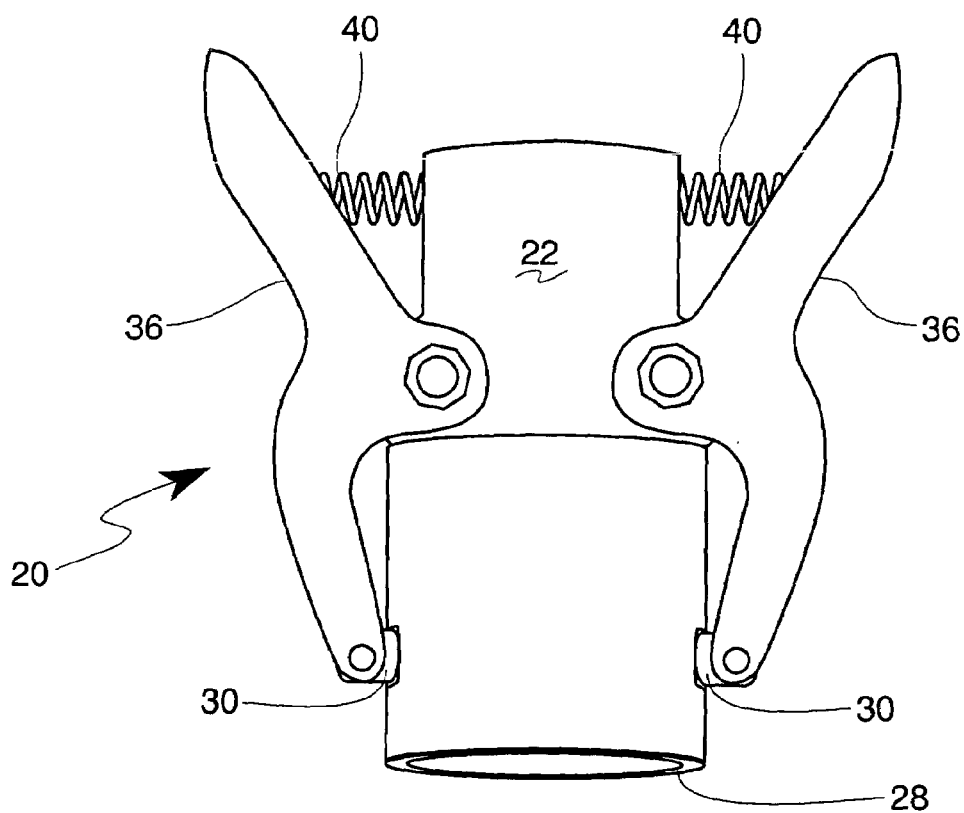
FIG. 2 is an elevational view of the coupler of the double-headed tent stake driver and puller of the present invention.
Figure 3:
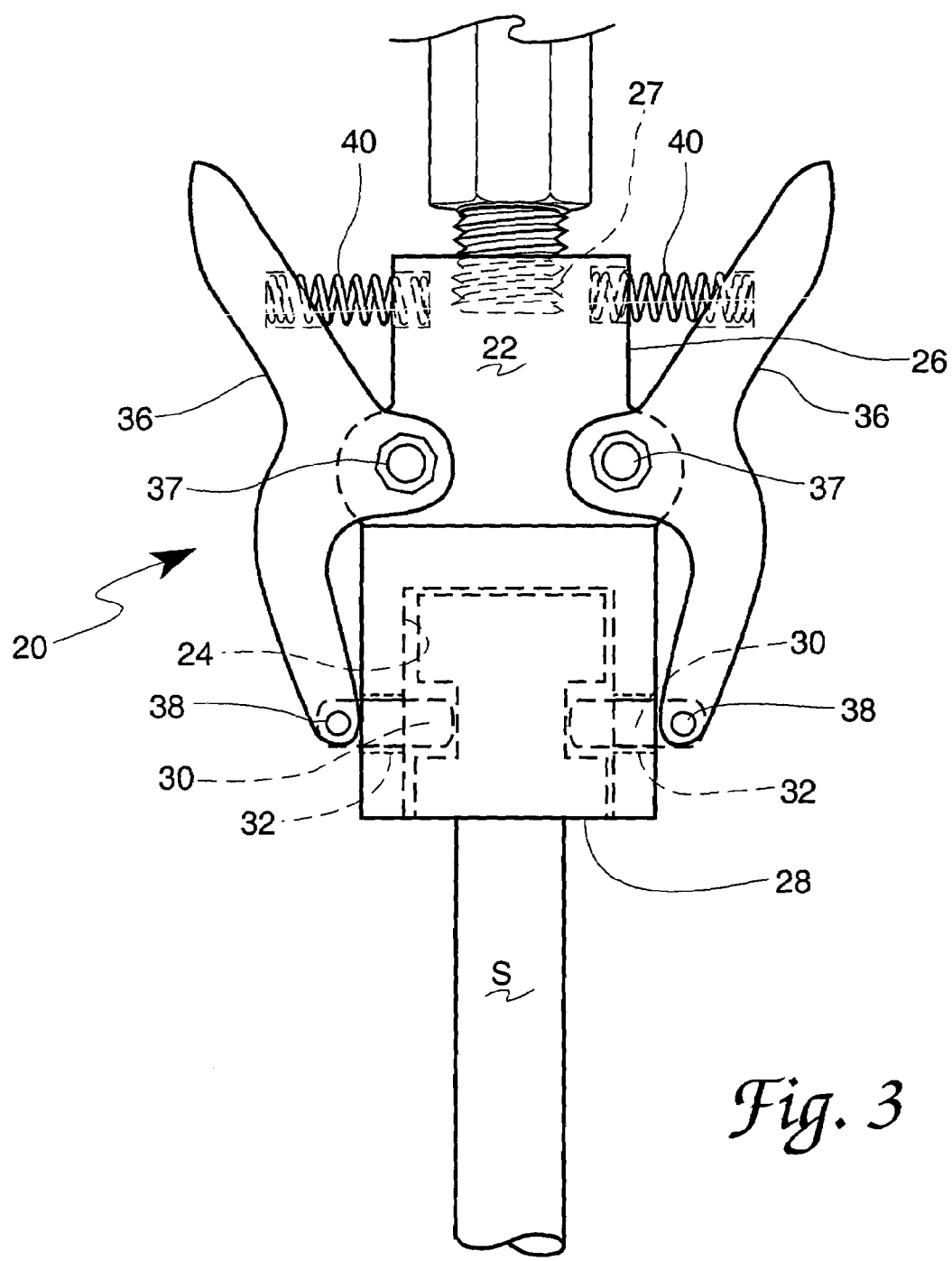
FIG. 3 is an elevational view of the coupler of the double-headed tent stake driver and puller of the present invention showing a double-headed tent stake in phantom received within the coupler, the keepers being shown in the closed position.
Figure 4:
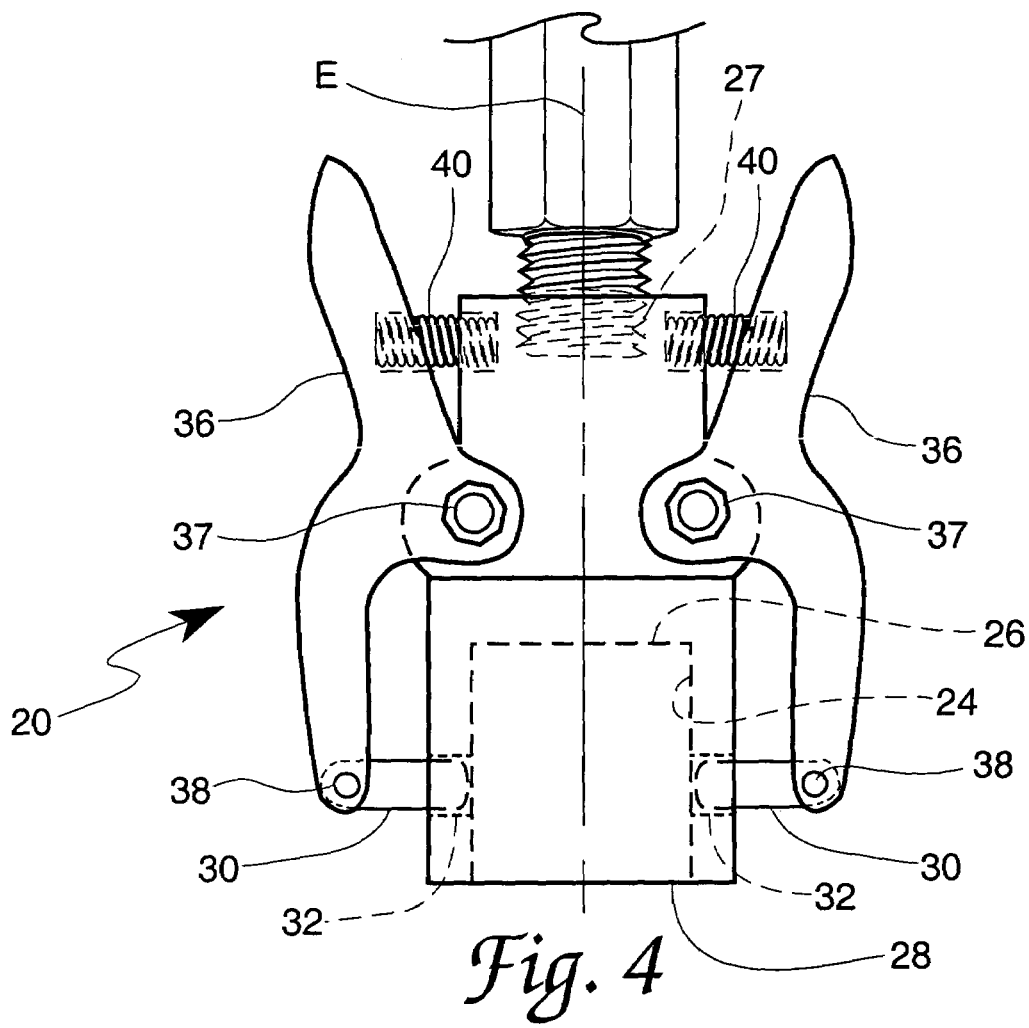
FIG. 4 is an elevational view of the coupler of the double-headed tent stake driver and puller of the present invention showing the keepers retracted to the open position.

As shown in FIG. 1, the double-headed tent stake driver and puller 10 includes a slide hammer 12. The slide hammer 12 includes a weight 14 slidably mounted on a shaft 16 having an elongate portion 18 and a distal end. A coupler 20 is mounted on the distal end of the shaft 16. As shown in FIGS. 2, 3 and 4, the coupler 20 has an axially elongate body 22 with a hollow core 24 sized to receive the head of a stake S or nail intended for use with the present invention. The coupler 20 has first and second ends designated 26 and 28 respectively. The first end 26 is closed and includes a threaded portion 27 for attaching the coupler 20 to the shaft 16. By virtue of this threaded engagement, a variety of interchangeable couplers 20 can be readily attached to the double-headed tent stake driver and puller 10 of the present invention for use with a variety of stakes and nails. Of course, other means of attachment of the coupler 20 can be used satisfactorily, such as welding. It should also be appreciated that the coupler 20 can be utilized with other driving and pulling tools, independently of the slide hammer 12.

Figure 5:
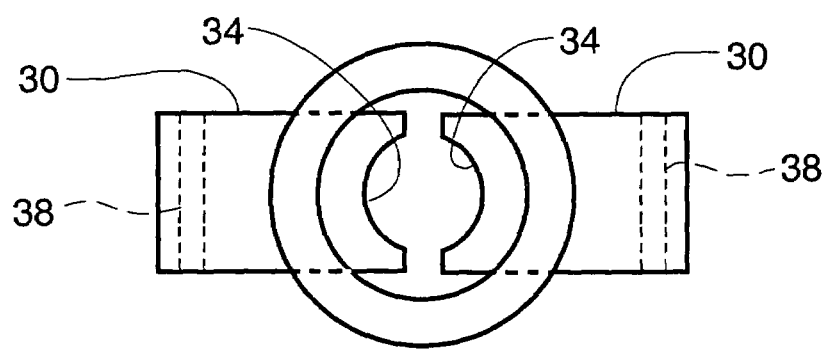
FIG. 5 is a plan view of the coupler of the double-headed tent stake driver and puller of the present invention taken along the coupler elongate axis, looking into the coupler.

The second end 28 of the coupler 20 is open for receipt of the stake or nail S. Advantageously and according to an important aspect of the present invention, the coupler 20 includes a pair of retractable keepers 30 slidably received within a corresponding pair of slots 32 located adjacent the second, open end. The keepers 30 provide the twofold benefits of retaining the stake once inserted into the coupler, and presenting a surface for imparting an extraction force upon a stake to be pulled from the ground. As shown in FIG. 5, the keepers each include a notch 34 for receiving the tent stake. The keepers 30 are preferably oriented orthogonally to the body elongate axis E, shown in FIG. 4.

A pair of spring loaded release levers 36 enable one handed retraction of the keepers for receipt of the tent stake. As shown in FIGS. 2, 3 and 4, the release levers 36 are pivotably attached to the elongate body 22. This pivotal attachment can be via through-bolts 37 as shown or by any other means as would be apparent to those skilled in the art. At their distal end, the release levers 36 are pivotably attached to the keepers 30. This pivotal attachment may be by pins 38 as shown or by any other means apparent to those skilled in the art.

A pair of springs 40 are retained between the elongate body 22 and the twin release levers 36. The springs 40 are provided to urge the release levers 36 to a closed position as shown in FIGS. 3 and 5 (the open position being shown in FIG. 4). In use, the release levers 36 are squeezed together by the user, retracting the keepers 30 for receipt of the tent stake or nail. When the user lets go of the release levers 36, the springs 40 urge the keepers 30 to a closed position, thereby retaining the tent stake S within the coupler, as shown in FIG. 3. The stake S can then be driven into the ground or pulled therefrom by use of the slide hammer 12. As can be appreciated, the stake S is retained within the coupler 20 by the keepers 30, until positively released by the user. This assures optimum placement of each driving blow and helps prevent damage to adjacent equipment, a common problem associated with the use of sledgehammers and pry bars.

As stated, the keepers 30 exert an upward force on the underside of the stake head during use, thereby imparting the pulling force. Conversely, the closed end of the coupler 26 provides a surface for imparting the driving force when insertion into the ground is desired. In this way, the double-headed tent stake driver and puller of the present invention can be used to both drive tent stakes into the ground as well as remove them. It is compact, enhancing safety and simplicity, and during use, imparts direct, linear forces to the stake, enabling the stakes to be installed in close proximity and removed without bending.

In summary, numerous benefits have been described from utilizing the principles of the present invention. The double-headed tent stake driver and puller having twin release levers of the present invention enables accurate installation and removal of double-headed tent stakes, nails and the like. The double-headed tent stake driver and puller 10 of the present invention can be used in all applications wherein stakes need to be driven and/or pulled into/from the ground, thereby avoiding use of the sledgehammer technique and its inherent limitations and difficulties. The double-headed tent stake driver and puller 10 is compact, lightweight and imparts direct, linear forces to the stake S during use, enabling the stakes S to be installed in close proximity and removed without bending.

The foregoing description of the preferred embodiment has been presented for purposes of illustration and description. It is not intended to be exhaustive or to limit the invention to the precise form disclosed. Obvious modifications or variations are possible in light of the above teachings. For example, a single spring for urging the release levers to the closed position may be substituted for the pair of springs of the preferred embodiment, depending on design and cost factors. The embodiment was chosen and described to provide the best illustration of the principles of the invention and its practical application to thereby enable one of ordinary skill in the art to utilize the inventions in various embodiments and with various modifications as are suited to the particular scope of the invention as determined by the appended claims when interpreted in accordance with the breadth to which they are fairly, legally and equitably entitled.

I claim:

1. A coupler for attachment to a driving tool for driving and pulling double-headed tent stakes, comprising:

an axially elongate body having a first, closed end and a second, open end, said body having a pair of slots passing therethrough adjacent said open end, said slots being substantially orthogonal to said body elongate axis;

a pair of retractable, planar keepers slidably received within said slots, each of said keepers further having an arcuate notch for receiving the tent stake;

a pair of release levers pivotably attached to said elongate body, each one of said release levers having a distal end pivotably attached to a respective one of said planar keepers; and, a pair of springs, each one of said springs being retained between said elongate body and a respective one of said release levers, said springs urging said release levers to a closed position.

2. The coupler of claim 1 further including a threaded portion within said first end for attachment to a driving tool.

3. A double-headed tent stake driver and puller, comprising;

a slide hammer including a shaft having an elongate portion and a distal end;

a coupler on said distal end of said shaft, said coupler having an axially elongate body including a first, closed end and a second, open end said body further having a pair of slots passing therethrough adjacent said open end, said slots being substantially orthogonal to said body elongate axis;

said coupler further including a pair of retractable, planar keepers slidably received within said slots, each of said keepers further having an arcuate notch for receiving the tent stake;

said coupler further including a pair of release levers pivotably attached to said elongate body, each one of said release levers having a distal end pivotably attached to a respective one of said planar keepers; and, said coupler further including a pair of springs, each one of said springs being retained between said elongate body and a respective one of said release levers, said springs urging said release levers to a closed position.

* * * * *